Figure 2:
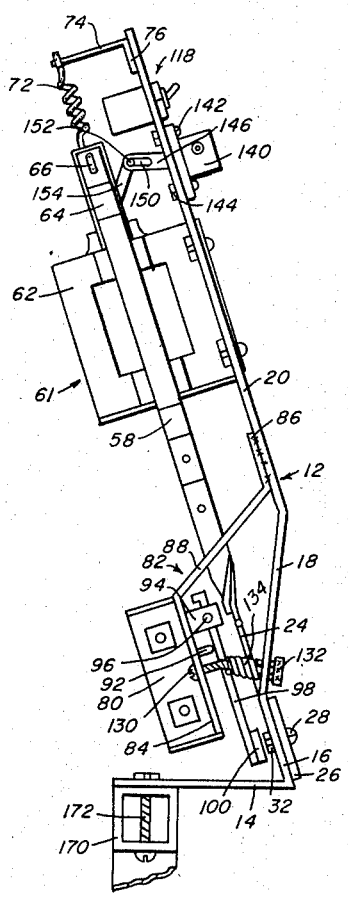

May 12, 1959 J. W. LOCHMILLER 2,886,037
DE-BEAKING MECHANISMS

Filed July 22, 1957 2 Sheets-Sheet 1

JESSE W. LOCHMILLER
INVENTOR.

BY *JC Baisch*

ATTORNEY

May 12, 1959 J. W. LOCHMILLER 2,886,037
DE-BEAKING MECHANISMS
Filed July 22, 1957 2 Sheets-Sheet 2

JESSE W. LOCHMILLER
INVENTOR.

BY *[signature]*

ATTORNEY

United States Patent Office 2,886,037
Patented May 12, 1959

2,886,037
DE-BEAKING MECHANISMS
Jesse W. Lochmiller, Whittier, Calif.
Application July 22, 1957, Serial No. 673,357
9 Claims. (Cl. 128—305)

This invention relates to means for de-beaking or trimming the beaks of poultry.

While the invention has particular utility in connection with the de-beaking of poultry and the like, and is shown and described in such connection, it is to be understood, of course, that its utility is not confined thereto.

An object of the present invention is to provide an improved de-beaking device or means for trimming the beaks of poultry and the like.

In the de-beaking of poultry, it is important to achieve a very high rate of de-beaking and it is, therefore, another object of the invention to provide means of this character with which such high rate of de-beaking may be effected.

In carrying out the latter object an electrically operated device is provided that is automatic in its operation.

Still another object of the invention is to provide means of this character having improved electric switch means for controlling the electrical circuit for the automatic operation, said switch being arranged to be actuated by the bird's beak when the latter is properly positioned for the cutting or trimming thereof.

A further object of the invention is to provide means of this character wherein the switch has an actuating arm so positioned behind the cutting blade as to serve as a stop or gauge limiting the distance the beak is inserted with respect to the cutting blades to thereby determine the amount of the beak which will be cut off.

A still further object of the invention is to provide means of this character having improved means for adjusting the position of said switch actuating arm for selectively predetermining the amount of the beak which will be cut off.

When making such adjustment it is sometimes necessary to try several positions and trim a beak at the respective positions before the proper one is found and it is, therefore, another object of the present invention to provide a manual control for the electrical circuit of the mechanism whereby a single cutting movement of the movable cutter blade is effected.

A further object of the invention is to provide an improved cutting blade arrangement.

Another object of the invention is to provide means for minimizing the noise of the machine's operation.

Still another object of the invention is to provide means of this character that is simple and sturdy in construction and that is reliable in operation.

The characteristics and advantages of the invention are further sufficiently referred to in connection with the following detailed description of the accompanying drawings which represent one successful embodiment. After considering this example, skilled persons will understand that many variations may be made without departing from the principles disclosed and I contemplate the employment of any structures, arrangements or modes of operation that are properly within the scope of the appended claims.

Figure 4:
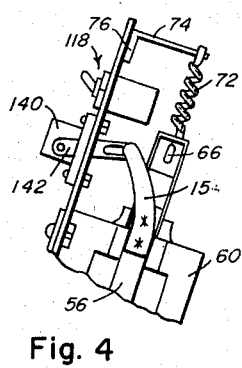
Figure 1:
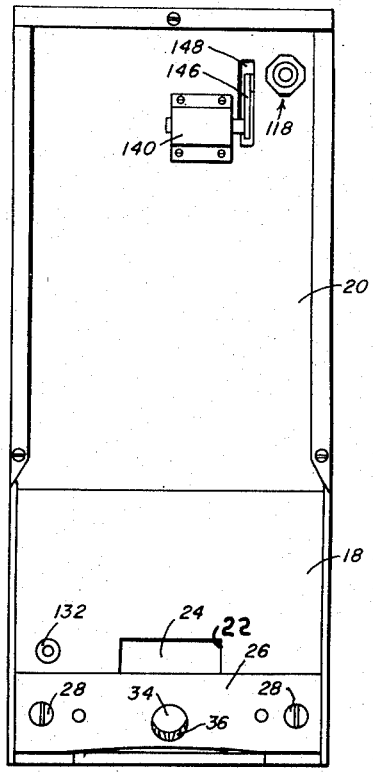
Figure 7:
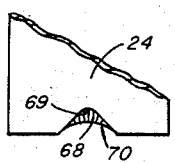
Figure 8:
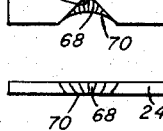
Figure 5:
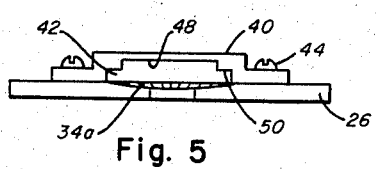
Figure 6:
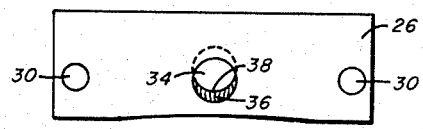
Figure 9:
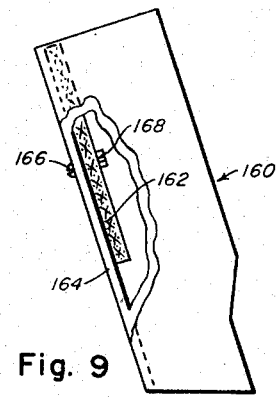
Figure 3:
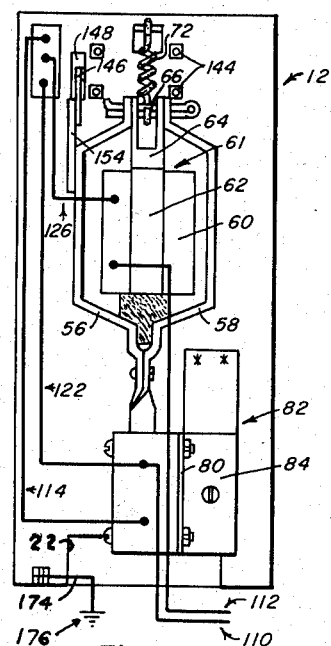
Figure 10:
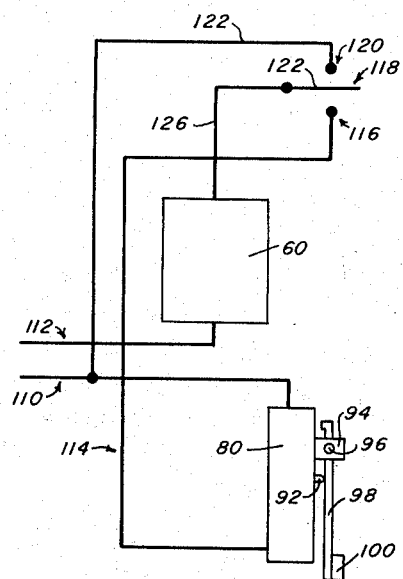

Referring to the drawings:
Fig. 1 is a front view of a de-beaking mechanism embodying the present invention;
Fig. 2 is a side view thereof;
Fig. 3 is a rear view of the same;
Fig. 4 is a view of the upper end of the mechanism shown in Fig. 1 as seen from the opposite side thereof;
Fig. 5 is an end view of a blade guiding means;
Fig. 6 is a front view of the fixed blade;
Fig. 7 is an enlarged fragmentary view showing the lower end of the movable cutting blade as seen from the rear side thereof;
Fig. 8 is a view of the cutting end of said movable blade;
Fig. 9 is a side view of the cover for said device with a portion broken away to show the sound deadening means therein; and
Fig. 10 is a diagram of the wiring system of the present arrangement.

Referring more particularly to the drawings, the apparatus comprises a mechanism supporting body or plate, indicated generally at 12, including a horizontal base 14. Successively upward from the front edge of said base 14 is an upwardly and rearwardly inclined part 16, a vertical part 18 and a rearwardly inclined part 20, the latter being substantially longer than the other parts and in a plane parallel to the plane of the part 16.

The part 16 is provided with a relatively wide notch 22 intermediate the ends thereof, extending from the bottom of said part up into the lower portion of the part 18 to provide proper clearance for a movable cutting blade 24 described more particularly hereinafter.

Across the front part 16 is a stationary cutting blade plate 26 removably secured to said part 16 by screws 28 passing through openings 30 provided therefor in said plate 26 and in said part 16 and provided with securing nuts 32. Midway of the ends of said blade plate is an opening 34 of sufficient size to permit ready insertion of the beak of a bird so that said beak may be trimmed or cut. The lower portion of said opening 34 is beveled at the outer side thereby providing an upwardly facing crescent shaped portion 36 to provide an arcuate shaped cutting edge 38 at the plane of the back side of said plate 26. Within the notch 22 is a blade guide member 40 having a recess 42 in the front face for slidable reception of said blade 24, said member 40 being secured to the back of said blade plate 26 by screws 44 slidably received in openings provided therefor in said guide member 40, said screws being threaded into tapped openings, not shown, provided in said blade plate 26. The guide member 40 is received in a widened part 46 in the lower part of the notch 22. Guide member 40 is provided with a further recess 48 of less width than the recess 42, leaving narrow side shoulders 50 which serve as bearing surfaces for the back side of the blade 24 to reduce friction at said side. The fixed blade is also slightly relieved at the back from the top edge down to the opening 34, as indicated at 34a.

While the movable blade 24 is mounted for actuation substantially as disclosed in applicant's copending application for de-beaking devices, Serial No. 584,202, filed May 11, 1956, a brief description thereof will be given.

Blade 24 is pivotally attached at its upper end to the lower end of a blade carrying frame by means of a pivot pin 54, said frame comprising members 56 and 58 of metal strips formed to provide an elongated opening in which is disposed a coil 60 of a solenoid, indicated generally at 61.

Solenoid coil 60 is of well-known character, having a frame 62 of laminated soft iron and a passage therethrough in which is slidably mounted a laminated armature 64, the latter being pivotally connected to the upper end of the blade carrying frame by means of a cotter pin 66. It is to be noted that the opening in the blade carrying frame provides space to accommodate said solenoid coil and the space is sufficiently long to permit operative movements of said frame.

The lower end of the movable blade 24 is provided with an arcuate notch 68, tapered rearwardly at 69 to provide a sharp cutting edge 70 which cooperates with the cutting edge 38 of the stationary blade, said movable blade 24 sliding upwardly and downwardly in the recess 42 of the blade guide 40. The movable blade 28 is urged upwardly by a spring 22 having the lower end hooked to the cotter pin 66 and the opposite end hooked through an opening provided therefor adjacent the free end of a rearwardly extending arm 74 of a bracket at the back side of the part 20 of plate 12, there being an arm 76 of said bracket extending downwardly of the opposite end of arm 74 and secured to the back of the part 20 of the plate 12 by any suitable means, such as, for example, spot welding.

It has been found that very good results are obtained by having the radius of the notch 68 approximately %4 of an inch and the angle of the tapered portion 69 approximately 45°. The angle of the tapered portion 36 of the opening 34 in fixed blade plate 26 is approximately 15°. Because of the arrangement of the movable blade and the fixed blade and guide the action is greatly improved, the cutting of the beaks is sharp and clean without any crushing thereof, and the speed of the operation is increased. Also sticking of the blade, due to the slight accumulation of blood on the blades is eliminated.

Downward movement of the blade carrying frame is effected when the solenoid coil 60 is energized, such energization of the coil causing the armature 64 to be drawn downwardly into the coil in the known manner against the yielding resistance of the spring 72 as described in the above referred to copending application, Serial No. 584,202. Downward movement of the armature is limited by means described in said copending application and return, upward movement of the frame is effected by spring 72, said return upward movement also being limited as described in said copending application. When the armature is at the upper limit of movement, the lower cutting edge of the movable blade 24 is disposed above the opening 34, and when the armature is at the lower limit of movement, the lower edge of said movable blade is below said opening. Thus, as the movable blade is moved downwardly by the solenoid mechanism, the cutting edge of the movable blade cooperates with the cutting edge 38 of the stationary blade and said movable blade is moved downwardly a sufficient distance to effect proper cutting action.

There is selective means provided for manually controlling the current to the solenoid coil 60 and also to effect automatic operation of the mechanism, the latter means including a normally open micro-switch 80 of well-known character attached to a part 80, normal to the plane of the plate 12, of a bracket of resilient material and indicated generally at 82. The bracket part 80 is of resilient material and has a flange turned rearwardly from a part 84 of the bracket, which part 84 is in a plane substantially parallel to the plane of the part 16 of plate 12. The bracket also includes a part 86 secured by spot welding or other suitable means to the rear side of the part 20 of plate 12 and connected with the part 84 of said bracket by a part 88. Screws 99 are used to attach the switch 80 to said flange 84 so the switch plunger 92 extends toward the front of the device and is spring urged outwardly to the normally switch open position. A pair of ears 94 extend forwardly from the front of the switch just above the plunger 92 and in laterally spaced relation to each other. A pivot pin 96 has its ends supported by said ears and extends between said ears. One end of a relatively light switch actuating arm 98 is attached adjacent the upper end to said pivot pin 96, said arm 98 extending downwardly in front of microswitch 80 in substantially parallel, forwardly spaced relation thereto with the plunger 92 engaged by said arm. The lower end of the arm extends to a position behind the opening 34 of the blade plate 26 and there is a beak engaging or contact disc or member 100, spot welded or otherwise secured to the lower end of said arm 98, directly behind said opening 34 so that said disc will be engaged by the tip of a bird's beak passed through opening 34, thereby actuating arm 98 and hence plunger 92 to close the micro-switch and effect energization of the solenoid which in turn snaps the movable blade 24 downwardly to cut off the free end portion of the beak which extends through said opening 34.

The electric circuit for the mechanism is shown diagrammatically in Fig. 10. Lines 110 and 112 are connected to a suitable source of electric power or current. Line 110 is connected to one side of the micro-switch 80, the other side of said switch 80 has a connection 114 with a fixed contact member 116 of a manually operable switch 118. Switch 118 has a second fixed contact member 120 which is connected to the line 110 by a wire 122. Line 112 is connected to one end of the solenoid coil 60, the other end of said coil 60 being connected to a movable contact member 124 of switch 118 by means of a wire 126. With this arrangement, when the movable contact 122 of switch 118 is moved into engagement with the contact member 116, the energization of coil 60 is controlled by the micro-switch 80 and every time the arm 98 is actuated clockwise, as shown in Figs. 2 and 10, the coil 60 is energized and the movable blade 24 actuated. Upon release of the arm 98 the coil 60 is de-energized and spring 72 raises the blade carrying frame and blade to the normal raised position. Should it be desired to effect a single trial cut, the movable contact member 122 is moved into engagement with the fixed contact member 120 whereupon the circuit to the solenoid 60 is closed and said solenoid is energized. The micro-switch is out of the operating circuit at this time and the solenoid remains energized until the movable contact member 122 is moved out of contact with the fixed contact member 120.

Means for adjusting the beak contact disc or plate 100 toward and away from the cutting blades is provided. This means comprises a screw 130 which is received in an opening provided therefor in the part 84 of the bracket 82. Screw 130 is bent slightly downwardly at a point adjacent the part 84 of the bracket and the forward end portion of said screw extends through an opening provided therefor in the part 18 of the plate 12, there being a nut 132 on said screw at the forward side of the part 18 to effect adjustment of the micro-switch toward and away from the plate 12. A spring 134 is disposed on the screw 130 between the part 84 of the bracket and the part 18 of plate 12 to urge the bracket portion 84 rearwardly. As stated above, the bracket is of somewhat resilient material so that there will be some flexing thereof, particularly of the part 88, to permit the above described adjustment of the switch 80 and the arm 98. By having the screw 130 bent somewhat, it has been found that said screw will not rotate in the openings provided therefor in the part 84 of the bracket and the part 18 of the plate when the nut 132 is rotated to adjust the position of said micro-switch and arm 98.

In order to keep count of the number of chickens or other poultry de-beaked, a counter 140 is attached to the upper part of the plate 12 by means of screws 142 received in openings provided therefor in the part 20 of the plate 12 and securing nut 144. The counting device 140 is of well-known character and has an oscillating arm 146 which extends through a slot 148 provided therefor in the adjacent part of the upper portion 20 of plate 12. The arm 146 is provided with an elongated slot 150 in which is received a pin 152 secured to an arm 154 which is attached to the blade carrying frame by any suitable well-known means such as spot-welding or the like. Thus, with each downward movement of the blade carrying frame the counter 140 is actuated in the usual manner.

A cover, indicated generally at 160, is provided for the device and is adapted to be attached to the face thereof as more particularly described in the above referred to copending application. In order to dampen the sound produced by the device when it is operated a piece of sound deadening material 162 is secured to the front wall 164 of the cover by means of a screw 166 having a retaining nut 168. The material 162 may be of any suitable well-known sound deadening type.

The above described mechanism may be attached to any suitable support means and, as shown, such support means comprises a bracket 170 such as shown and described in the above referred to copending application. The mechanism is secured to said support 170 by means of a screw 172.

Grounding of the mechanism is provided for as indicated by wire 174 and ground symbol 176, said ground eliminating danger to the operator of electrical shock.

It is thought that the invention and many of its attendant advantages will be understood from the foregoing description and it is thought that it will be apparent that various changes may be made in the form, construction and arrangement of the parts of the invention without departing from the spirit and scope thereof or sacrificing all of its material advantages, the form hereinbefore described being merely by way of one successful embodiment.

I claim:

1. A de-beaker, including: mechanism support means comprising an upright plate having a generally horizontal rearwardly turned base, there being a notch which extends upwardly from the lower edge portion of said plate; a stationary blade member secured to the plate and over said notch, said member having an opening therein with an arcuate, upwardly facing sharp cutting edge at the inner face of said member; a blade guide secured to the back of said blade member and having narrow bearing surfaces at the sides thereof; a movable blade slidably disposed in said guide, said bearing surfaces engaging the back side edge portions of said movable blade, said movable blade having an arcuate cutting edge in the lower end substantially midway between the sides thereof and curved oppositely of the cutting edge of the fixed blade member; means for actuating said movable blade, said means comprising electrical actuator means operably connected to said movable blade and adapted to move same in the cutting direction; yielding means urging the movable blade in the opposite direction; a wiring circuit for said electrical actuator means; a normally open micro-switch in said wiring circuit, said micro-switch having a plunger normally urged outwardly and facing in the direction of the blade; a switch actuating arm pivotally attached to said micro-switch and adapted to actuate said plunger inwardly to close said micro-switch; means for supporting said micro-switch with the free end of said arm behind and adjacent to the opening in said fixed blade member; means for moving said micro-switch toward and away from said opening to thereby adjust the position of said free end of said arm toward and away from the blades; a manually actuated master switch having two closed positions, at one of which said micro-switch is connected into the electric circuit for controlling said electrical actuator means, and at the other closed position said actuator is directly connected for energization; a cover removably secured to the plate at the back thereof for covering the mechanism; and sound deadening means attached to the inside of said cover for minimizing the noise of the mechanism when operating.

2. A de-beaker, including: mechanism support means comprising an upright plate, there being a notch which extends upwardly from the lower edge of said plate; a stationary blade member secured to the plate and over said notch, said member having an opening therein with an arcuate, upwardly facing sharp cutting edge at the inner face of said member; a blade guide secured to the back of said blade member and having narrow bearing surfaces at the sides thereof; a movable blade slidably disposed in said guide, said bearing surfaces engaging the back side edge portions of said movable blade, said movable blade having an arcuate cutting edge in the lower end and curved oppositely of the cutting edge of the fixed blade member; means for actuating said movable blade, said means comprising electrical actuator means operably connected to said movable blade and adapted to move same in the cutting direction; yielding means urging the movable blade in the opposite direction; a wiring circuit for said electrical actuator means; a normally open micro-switch in said wiring circuit, said micro-switch having a plunger normally urged outwardly and facing in the direction of the blade; a switch actuating arm pivotally attached to said micro-switch with the free end of said arm behind and adjacent to the opening in said fixed blade member; means for moving said micro-switch toward and away from said opening to thereby adjust the position of said free end of said arm toward and away from the blades; and a manually actuated master switch having two closed positions, at one of which said micro-switch is connected into the electric circuit for controlling said electrical actuator means, and at the other closed position said actuator is directly connected for energization.

3. In a de-beaker: mechanism support means comprising an upright plate having a notch which extends upwardly from the lower edge of said plate; a stationary blade member secured to the plate and over said notch, said member having an opening therein with an arcuate, lower portion inclined upwardly and rearwardly at an angle of approximately 15° terminating at the back in an upwardly facing sharp cutting edge at the inner face of said member; a blade guide secured to the back of said blade member and having narrow bearing surfaces at the sides thereof; a movable blade slidably disposed in said guide, said bearing surfaces engaging the back side edge portions of said movable blade, said movable blade having an arcuate notch in the lower end on approximately a 9/64" radius and a rearwardly and upwardly extending part at approximately a 45° angle, the front edge of said notch being a cutting edge curved oppositely of the cutting edge of the fixed blade member; means for actuating said movable blade in the cutting direction; yielding means urging the movable blade in the opposite direction; and means for controlling the actuator means.

4. A de-beaker, including: mechanism support means; a stationary blade member secured to said support means, said member having an arcuate, sharp cutting edge, a blade guide secured to said blade member; a movable blade slidably disposed in said guide, said movable blade having an arcuate cutting edge cooperable with the cutting edge of the fixed blade member; means for actuating said movable blade, said means comprising electrical actuator means operably connected to said movable blade and adapted to move same in the cutting direction; yielding means urging the movable blade in the opposite direction; a wiring circuit for said electrical actuator means; a normally open switch in said wiring circuit; a switch actuating arm operably mounted for actuation of said switch; means for supporting said switch with said arm operably positioned relative to the cutting edges of said blades and adapted to be operably engaged by a beak of a bird positioned between said cutting edges; means for adjusting said arm toward and away from the blades; and a master switch having two closed positions, at one of which the first mentioned switch is connected into the electric circuit for controlling said electrical actuator means, and at the other closed position said actuator is directly connected for energization.

5. In a de-beaker: mechanism support means comprising an upright plate having an opening therein; a stationary blade member secured to said support mechanism and having a cutting edge; a movable blade slidably mounted with respect to said fixed blade and having a cutting edge cooperable with the cutting edge of said fixed blade; electrically operable means for actuating said movable blade in the cutting direction; yielding means urging the movable blade in the opposite direction; means for controlling the actuator means, including a switch having an actuating arm; support means for said switch supporting same in a position whereat the arm thereof is operably positioned behind the blades for operable engagement by the beak of a bird when said beak is placed in the cutting position; and means for adjusting said switch toward and away from said blades, said means comprising a screw having a bend intermediate the ends thereof, said screw having one end connected to the switch support means and having a portion of the opposite end extending through the opening in said plate; and an adjusting nut on the end of the screw extending through said plate opening.

6. In a de-beaker: a mechanism support plate having an opening therein; a stationary blade secured to said plate; a movable blade operably arranged for cooperative action with the fixed blade; electrical actuator means connected to the movable blade and adapted to actuate same; a bracket attached to the back of said support plate, said bracket having a resilient portion and a portion in a plane generally parallel to the plate and having an opening therein; means for controlling said electrical actuator means, said control means including a switch having an actuator arm, said switch being secured to said bracket with the actuator arm positioned behind the cutting blade in operable relationship thereto; and means for adjustably moving said bracket to move the actuator arm of the switch toward and away from said blades, said adjusting means including a screw received in the opening in the bracket part, said screw having a head engaging said bracket part and being bent adjacent said head, the opposite end portion of said screw being received in the opening in the plate; and an adjusting nut on said free end of said screw at the front side of the plate and adapted to effect adjustment of said switch toward and away from said blades.

7. A de-beaker, including: mechanism support means; a stationary blade member secured to said support means, said member having a sharp cutting edge; a movable blade having a cutting edge, said movable blade being operably arranged relative to said fixed blade; means for actuating said movable blade, said means comprising electrical actuator means operably connected to said movable blade; a wiring circuit for said electrical actuator means; a normally open switch in said wiring circuit; a switch actuating arm operably mounted for actuation of said switch; means for supporting said switch with said arm operably positioned relative to the cutting edges of said blades and adapted to be operably engaged by a beak of a bird positioned between said cutting edges; means for adjusting said arm toward and away from the blades; and a master switch having two closed positions, at one of which the first mentioned switch is connected into the electric circuit for controlling said electrical actuator means, and at the other closed position said actuator is directly connected for energization.

8. In a cutting device: a first blade member having a cutting edge; a second blade member having a cooperable cutting edge, one of said blade members having a slightly relieved area in the side facing the other blade member, the cutting edge of said one blade member being at the area of said relieved portion; and means for supporting said blades for relative cooperable movement relative to each other.

9. In adjustable support means: a support member having an opening therein; a resilient bracket attached to said support means, said bracket having a part with an opening therein; a screw having a head thereon, said screw having a bend therein adjacent said head and received in the opening in said bracket with the head engaging said bracket, the opposite end of said screw being slidably received in the opening in the support member, and extending beyond the adjacent part of said support member; and a nut threadably received on the end of the screw projecting through the opening in said support member, said nut being adapted to longitudinally move said screw to effect movement of the portion of the bracket having the opening therein toward and away from said support member.

References Cited in the file of this patent
UNITED STATES PATENTS

| | | |
|---|---|---|
| 771,752 | Stafford | Oct. 4, 1904 |
| 845,331 | Briede | Feb. 26, 1907 |